Aug. 19, 1924.
W. P. HEATH
1,505,342
METHOD OF DETERMINING THE VOLUME OF OCCLUDED GAS IN A PLASTIC MASS
Filed Oct. 28, 1922
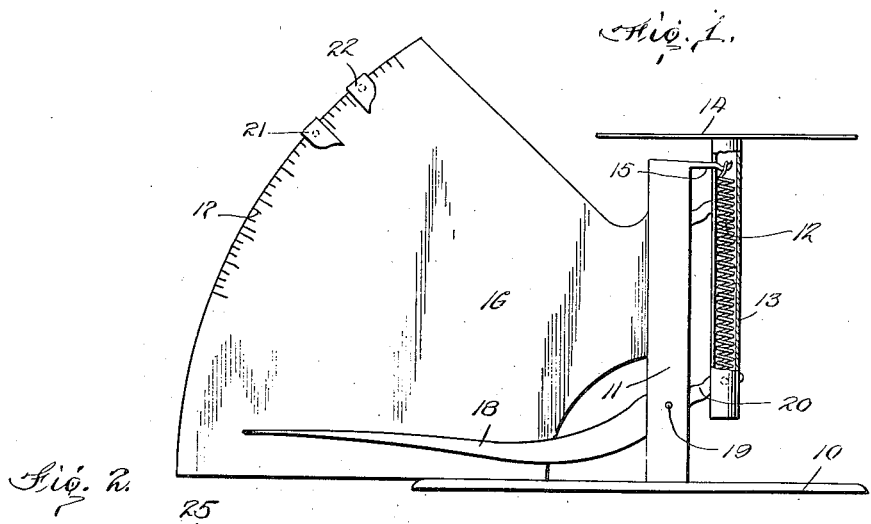
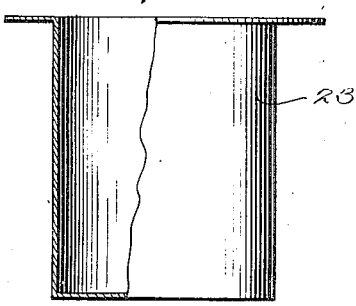
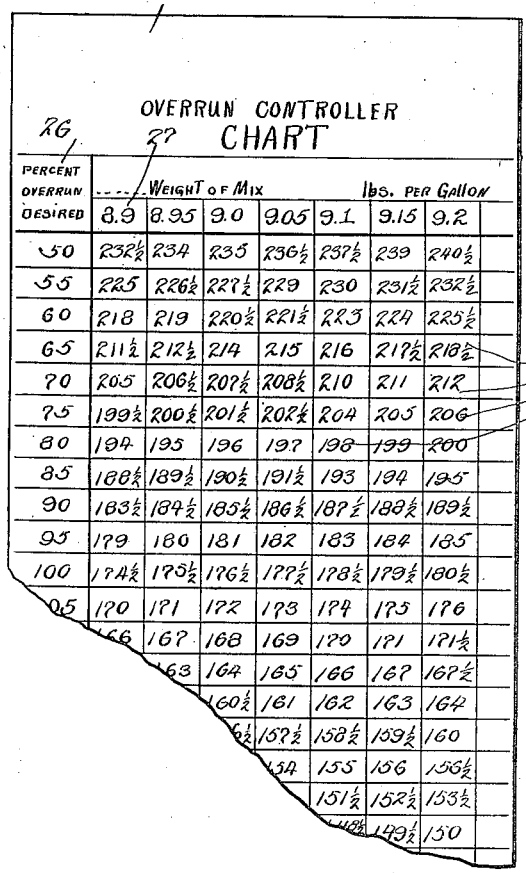
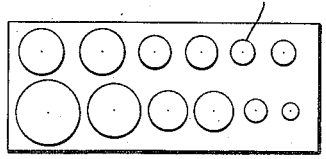
Inventor
Wilfred P. Heath.
by J. H. Ferguson
Attorney Patented Aug. 19, 1924.

1,505,342

UNITED STATES PATENT OFFICE.

WILFRID P. HEATH, OF CHICAGO, ILLINOIS, ASSIGNOR TO MOJONNIER BROS. CO., OF CHICAGO, ILLINOIS, A CORPORATION OF ILLINOIS.

METHOD OF DETERMINING THE VOLUME OF OCCLUDED GAS IN A PLASTIC MASS.

Application filed October 28, 1922. Serial No. 597,521.

*To all whom it may concern:*

Be it known that I, WILFRID P. HEATH, a citizen of the United States, residing at Chicago, in the county of Cook and State of Illinois, have invented certain new and useful Improvements in Method of Determining the Volume of Occluded Gas in a Plastic Mass, of which the following is a specification, reference being had to the accompanying drawings.

This invention relates to a method of determining the percentage of occluded gases in plastic materials, such as ice cream, candy nougat, marshmallow, facial pomades, butter, sherbets, ices and the like, in which the materials either at all times or when freshly made are more or less semi-liquid or plastic.

These materials, in the process of making them, are beaten or agitated to cause the occlusion of bubbles of gas such as air therein, and it is particularly important to provide a method of determining whether or not sufficient gas has been occluded in the material by agitation or otherwise to secure a certain weight for a certain bulk of the aerated material. This is particularly important where materials are to be packed in cartons of a certain cubic content. Thus, for instance, butter is today very largely packed in cartons and these cartons should weigh a certain definite amount, as for instance, one pound. Butter varies in weight according to the amount of occluded gases therein, and hence it is necessary to provide some means for determining when sufficient gases have been occluded within the butter to cause the amount of butter which may be packed within a carton to weigh, say one pound. The same is true of tooth pastes, facial creams and other forms of plastic material which are commonly put up in tubes, bottles and like containers.

This method, while it may be used in a large variety of circumstances, is particularly adapted for indicating whether a cream, such as ice cream, has occluded the proper proportion of gas so that a predetermined bulk of the cream will weigh a predetermined amount, and in describing the method I shall describe it with reference to the testing of ice cream.

In the accompanying drawings:

Fig. 1 is a side elevation of a weighing scale such as may be used in carrying out my improved method.

Fig. 2 is a face view of a test chart or card of the character used with my method.

Fig. 3 is an elevation partly in section of a test cup used with my method.

Fig. 4 is a face view of a set of weights designed to be used with the weighing scale.

The method is to be used in connection with a suitable weighing device such as that illustrated in the drawings, which weighing device forms the subject matter of a copending application filed of even date herewith. Before considering the method itself, I will briefly describe the weighing device. The weighing device comprises a base 10, a standard 11, a spring 12 supported at its upper end on an arm 15 projecting from the standard 11, this spring supporting a hollow member 13 upon which the platform 14 is mounted. Carried upon the base 10 is a scale 16, and pivoted upon the standard 11 is a pointer 18 which moves over the scale, the rear end of the pointer being pivoted to the member 13 for movement therewith. The scale is formed upon its margin with graduations 17 if desired, and movable over the scale is a marker 21 which is adapted to be held to the scale at any point to which it may be adjusted, as by a set screw, and preferably a second marker 22 is also used which is also shiftable over the scale and may be held by any suitable means at any point to which it is adjusted. These two markers 21 and 22, when both are used, indicate the maximum and minimum points to which the pointer 18 may be shifted to secure a predetermined result.

Co-acting with the weighing device is a cup 23 of aluminum or other material and having a certain definite cubical content, and also intended to be used with the cup are a series of weights 24. A scale card 25 is also used, a portion of which is shown in Fig. 2, this scale card at its left hand side being provided with a column 26 having therein figures indicating the percent of "overrun" desired. The card is also formed with a horizontal row of figures 27 heading vertical columns 28, the figures in the row 27 indicating the weight of the materials, as for instance a batch of ice cream per gallon, that is the weight which a gallon of cream should weigh when it has occluded therein a certain proportion of gas. The figures in the vertical columns 28 opposite the figures in the column 26 show what a certain definite amount of the ice cream should weigh in order that a gallon of the completed ice cream will have a certain weight.

Illustrating my method by stating its use in determining the character of ice cream, I will say that in the manufacture of ice cream the freezing operator desires to draw his ice cream from the freezer at a definite overrun percentage, that is to say if he desires 100 gallons of liquid mix to make 190 gallons of ice cream, his percentage of overrun or yield is 90. Assuming that he is freezing a mixture weighing 9 pounds to the gallon into ice cream, then by consulting the card 25 he observes that the weight of a cupful of ice cream (filling the cup 23 exactly level with the top) should be 185½ grams in order to secure the overrun, that is the total weight per gallon of the ice cream which it is desired to obtain. Accordingly he places the test cup 23 upon the platform 14 and places therein weights 24 to the amount of 185½ grams. The pointer 18 will then come to rest at a point upon the graduated scale 17 and the adjustable marker 21 or the adjustable markers 21 and 22 are shifted to permanently mark the locus of this point so that after a removal of the weights from the cup 23, the point at which it is desired the mark shall move will be indicated at all times. He then mixes the ice cream and freezes it and fills the cup 23 with the frozen mix or matrix and places it upon the scale 14. If now the pointer 18 moves to the point indicated by the marker 21 or between the markers 21 and 22, it indicates that the ice cream (that is the material with its occluded gas bubbles) has the proper weight and needs no additional beating either to reduce or increase its weight. However, if the pointer is shifted to a point above the marker 21, or the marker 22 in case two markers are used, it indicates that the ice cream is too heavy in weight and needs additional beating in order to reduce this weight, that is to increase the percentage of occluded gas in the mass. If, however, the pointer 18 is deflected to a point below the point indicated by the marker 21, then it indicates that the aluminum test cup contains a cream too light in specific gravity and the yield or swell needs to be beaten out until the level test cup filled with ice cream from the freezer deflects the pointer to the point required. The additional pointer 22 is for the purpose of being operated jointly with the pointer 21 in order to fix maximum and minimum limits of weight that the freezer must adhere to. In other words, if the manufacturer determines that he shall draw his ice cream with not less than 90% overrun and not more than 100% overrun from a 9-pound mix, the adjustable pointers are set to correspond with 185½ and 176½ grams respectively and the freezing operator must keep within this range.

Now it will be noted that this method of operating gives the volumes of occluded gases by means of the deflection of the pointer of a weighing machine. It will likewise be seen that liquids are not being dealt with at all but plastic materials with occluded bubbles of gas, and that further no attempt is being made to secure the specific gravity of the liquids composing the mass, but that a determination is secured of the amount of occluded bubbles within a mass of known specific gravity by gravitational attraction acting upon a vessel full of the material stricken off level with the top of the vessel. There is no necessity of eliminating the occluded gas, but by my method it is possible to determine whether or not a mix having occluded gas therein has sufficient occluded gas to cause the mix to correspond with a certain definite test point. In other words, it determines when a predetermined degree of occlusion has been reached.

Without regard to the materials being operated upon and whether these are ice cream, butter, facial pomades, etc., by consulting the card 27, which, of course, is based upon the specific gravities of the various articles being treated, the ultimate weight per gallon or per any other measure of bulk is attained, this ultimate weight being expressed, not in pounds per gallon or in any other unit of weight per other unit of measure, but the result is reported as "percentage of overrun", in other words the number of volumes of gas occluded with 100 pounds of mix. In selling plastic materials it is particularly important not to get too little or too much occluded gas in the product to be sold, and with my method before a run is made whether in making ice cream, pomades, pastes or any other mix, the operator sets the marker 21 or the markers 21 and 22 in the manner described so as to indicate the degree to which the pointer is to be moved when the aluminum cup 23 is entirely filled with the material under consideration with its occluded gases. All day long in using this method, whether or not the pointer reaches this marker is alone to be considered.

By the use of the weighing machine absolute accuracy is obtained and no reliance has to be placed upon the accuracy of the operator's eye in reading the degrees on the scale, nor does any allowance have to be made for inaccuracies in the scale. Variations in the tension of the spring supporting the platform 14 are immaterial. The weight of the cup is immaterial. The operator may soak the entire machine over night in water or in disintegrating acids or lye. The acid might eat away 10% of the spring or into the platform or reduce the weight of the cup without making any difference in the result for the reason that the new locus for the pointer, whatever it is, is marked by the sliding marker 21 each morning, and when the weight in the food product contained within the cup tallies with the weights used before the day's run, the goal has been attained. Thus by setting the exact locus daily, chance results are entirely eliminated. Obviously this method does not require the use of the exact form of weighing mechanism which has been illustrated and described, and obviously the method might be applied to the production of a large number of products not specified in this application.

I claim:

1. A method for determining the degree of occlusion of gas within a plastic matrix by using a scale, a container and a chart showing the weights of the containerful of the matrix inflated to different degrees, said method consisting in determining from the chart the said weight corresponding to the desired degree of inflation, locating the scale indication corresponding to said determined weight, placing upon the scale a containerful of the inflated matrix and comparing the resulting indication with the aforesaid indication, and then, if the two are not the same, varying the amount of occluded gas in the matrix until a subsequent similar weighing shows the first mentioned scale indication.

2. A method for determining the degree of occlusion of gas within a plastic matrix which consists in determining the weight which a definite bulk of the matrix should have when a definite percentage of gas has been occluded, placing upon a weighing scale a container adapted to be exactly filled by said definite bulk, locating a single calibration point upon the scale by adding to the weight of the container the weight first determined, removing said added weight, completely filling the container with the matrix under test and comparing the resulting indication with that previously calibrated, and varying the amount of occluded gas in the matrix until a subsequent weighing shows a balance at said previously located calibration point.

WILFRID P. HEATH.